Oct. 18, 1966  J. J. FRY  3,279,276
MOTION TRANSMITTING MECHANISMS
Filed July 16, 1964  2 Sheets-Sheet 1

INVENTOR.
Jeremy Joseph Fry
BY
Stevens, Davis, Miller & Mosher
ATTORNEYS

Oct. 18, 1966  J. J. FRY  3,279,276
MOTION TRANSMITTING MECHANISMS
Filed July 16, 1964  2 Sheets-Sheet 2

INVENTOR.
Jeremy Joseph Fry
BY
Stevens, Davis, Miller & Mosher
ATTORNEYS

United States Patent Office 3,279,276
Patented Oct. 18, 1966

3,279,276
MOTION TRANSMITTING MECHANISMS
Jeremy Joseph Fry, Somerset, England, assignor to Rotork Engineering Company Limited, Bath, Somerset, England
Filed July 16, 1964, Ser. No. 383,113
Claims priority, application Great Britain, July 25, 1963, 26,460/64
6 Claims. (Cl. 74—424.8)

This invention relates to motion transmitting mechanisms and in particular to a mechanical unit for transmitting the rotary movement of a mechanical member into an axial movement of an associated mechanical member. The invention is particularly, but not exclusively, applicable to valve actuators of the kind having a rotary output shaft coupled with a valve spindle which is movable in one or other axial direction depending upon the direction of rotation of the output shaft. This movement is normally obtained by means of a nut member which is restrained against axial movement but which is rotatable by the output shaft. The associated valve spindle threadably engages the rotatable nut and is thereby moved axially in response to rotation of the output shaft.

In previous constructions of valve actuators the nut member has been mounted internally of the actuator. Generally the nut member has been mounted or formed as part of the hollow output shaft of the actuator and this arrangement has one serious disadvantage as the spindle capacity is obviously limited for a given size of actuator. Obviously any desired increase or change in the spindle capacity has meant the redesign of the actuator so as to house the increased or different size of the mechanical unit.

It is, therefore, an object of the present invention to avoid the above disadvantage and to provide a mechanical unit which is quite separate from the output shaft of the actuator and which is generally located externally of the actuator casing as a separate unit the size depending upon the desired spindle capacity of the actuator.

In its broadest aspect the invention provides a motion transmitting mechanism for an actuator having an output shaft extending from the actuator casing and rotatably driven in one or other direction, said mechanism comprising a nut member having a flange thereon adapted to abut the end surface of the output shaft, a driving connection between the flange of the nut member and the output shaft whereby the nut member is rotatably driven in one or other direction in accordance with the rotation of the output shaft, a sleeve surrounding the nut member and an adjacent portion of the output shaft, said sleeve threadably engaging said output shaft and having a flange thereon which engages beneath the flange of said nut member to maintain said nut member in driving engagement with the output shaft, and a spindle drivably connected with the nut member for movement thereby in response to rotation of the output shaft of the actuator.

In the preferred embodiment of the invention the driving connection between the output shaft and the nut member comprises one or more driving keys or like members which extend axially from the end of the output shaft and which engage corresponding slots formed in the flange of the nut member.

The nut member may be internally threaded so as to engage a threaded spindle which is thereby movable axially in one or other direction in response to the rotation of the nut member. Alternatively, the nut member may be formed with an axial keyway whereby the spindle is secured therein for rotation in response to rotation of the nut member.

The nut member may extend within the end of the hollow output shaft with its flange abutting the end of the shaft. Alternatively, the nut member may extend axially from the end of the output shaft as a continuation thereof, the flange of the nut member being engaged between the flange of the sleeve and the end of the output shaft.

In order that the invention may be clearly understood the preferred embodiment will now be described by way of example with reference to the accompanying drawings, in which.

Figure 1:
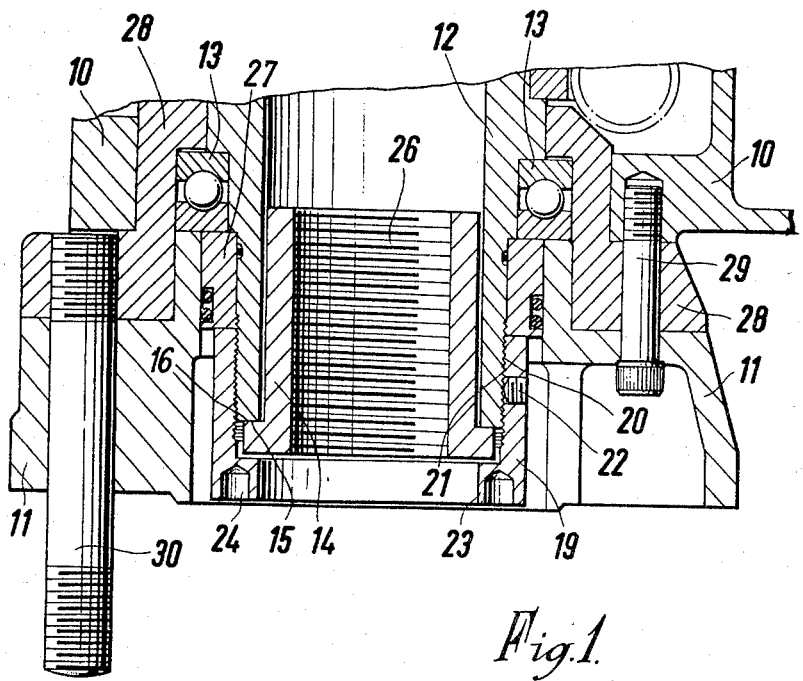
FIGURE 1 is a sectional elevation of part of a valve actuator showing the output shaft and the associated nut member whereby the rotational movement of the output shaft is transmitted by means of the invention into an axial movement of the valve spindle.

Referring now to the drawings, and in particular to FIGURE 1, there is shown a portion of a valve actuator to which the invention is particularly applicable. The actuator comprises a main casing 10 which generally is positioned substantially vertically. The lower part of the casing 10 is provided with a closure plate 11 which has an outlet therein for the lower end of a hollow output shaft 12 which extends vertically in the main casing 10 of the actuator. The output shaft 12 is rotatably mounted in the casing 10 in suitable bearings and in FIGURE 1 the lower bearing is shown by the reference 13. The bearing 13 is a thrust bearing capable of receiving and absorbing the thrust from the valve spindle in either direction of movement as the actuator is operated.

The lower end of the output shaft 12 drivably engages a rotatable sleeve shown as a nut member 14 as will be hereinafter described so that the nut is mechanically connected to the shaft 12 for rotation therewith in one or other direction depending upon the energization of the motor of the actuator. The nut member 14 is entirely separate from the output shaft 12 and is mounted as shown on the end of the shaft outside the actuator casing 10.

As shown in FIGURE 1 of the drawings the rotatable nut member 14 is slidably mounted within the lower end of the output shaft 12 in which it fits with a slight clearance to allow for possible misalignment of the valve spindle. The nut member is formed with a flange 15 on its lower end which abuts and seats on the lower end surface 16 of the output shaft 12. As shown more clearly in FIGURE 2 of the drawings the driving connection between the output shaft 12 and the nut member 14 comprises a pair of driving keys or dogs 17 which extend axially from the end surface of the shaft 12 and are located on opposite sides of the shaft. The keys 17 drivably engage corresponding slots 18 which are formed in the flange 15 of the rotatable nut member 14.

The assembly is completed by means of a short outer sleeve 19 which is internally threaded as shown at 20 to engage a threaded portion 21 on the outer surface at the lower end of the output shaft 12. The sleeve 19 is provided with a locking screw 22 so as to ensure the rotation of the sleeve 19 with the output shaft 12. The sleeve 19 is formed with a flange 23 formed with a number of apertures 24 to enable the sleeve to be rotated and locked in position so as to engage the flange 15 of the nut member 14 firmly in position against the lower surface 16 of the output shaft 12.

Figure 2:
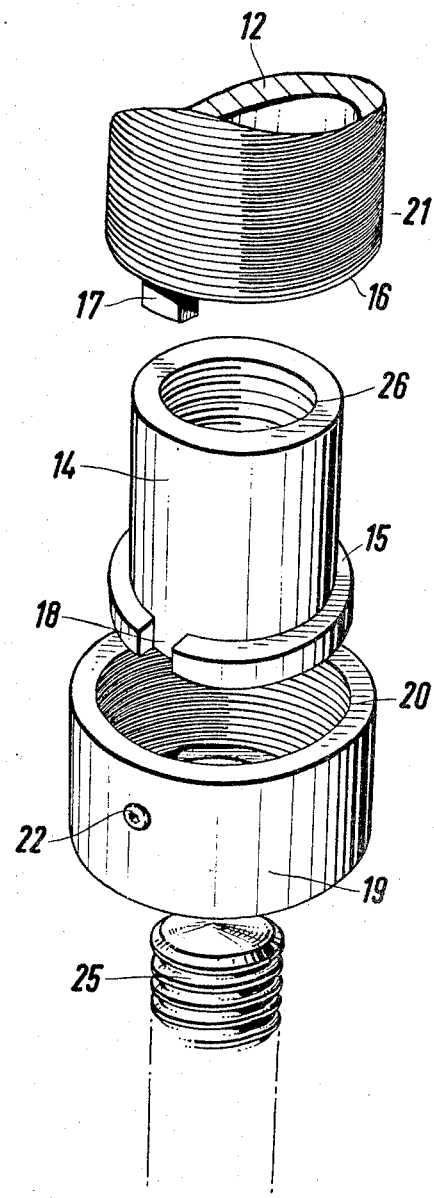
FIGURE 2 is an exploded perspective view of the various parts forming the motion transmitting mechanism or mechanical unit of the invention.

A rising valve spindle which is shown in Figure 2 of the drawings by the reference numeral 25 is externally screw threaded at its upper end and is mounted in the nut member 14 for threadably engaging the internal threaded portion 26 of the nut member 14 so that rotation of the nut member by the output shaft 12 will produce an axial movement of the valve spindle 25 in one or other direction depending upon the direction of rotation of the nut member 14 by the output shaft 12.

The thrust due to movement of the valve spindle 25 is transmitted through the sleeve 19 to the collar 27 and thereby to the thrust bearing 13. As shown in FIGURE 1 of the drawings the thrust bearing 13 is mounted within a member 28 which is secured in position between the lower end of the casing 10 and the closure plate 11 by connecting members 29. The assembly is completed by attachment bolts 30 for attaching a lower casing around the sleeve 19 and the valve spindle 25 extending therefrom.

During the operation of the actuator the valve spindle 25 moves axially within the nut member 14 and the hollow output shaft 12. It will be appreciated that the positioning of the nut member 14 externally of the actuator casing permits, among other advantages, the provision of a mechanical unit which can be attached as desired to give the required spindle capacity for the actuator. A desired spindle capacity can be obtained for any given size of actuator without affecting the actuator construction and in particular the size and design of the output shaft. The mechanical unit as shown in the drawing can be easily attached and changed without in any way affecting the standard actuator construction. If an increased spinde capacity is required the only modification concerns the size of the external nut construction which can be changed or otherwise modified to suit the output requirements. Any change in the spindle capacity does not affect the construction of the actuator so that the spindle capacity can be varied as required for a given size of actuator. Furthermore, the arrangements permit the construction of a standard size of actuator which can be modified by providing a suitable nut construction to match the spindle capacity required.

Figure 3:
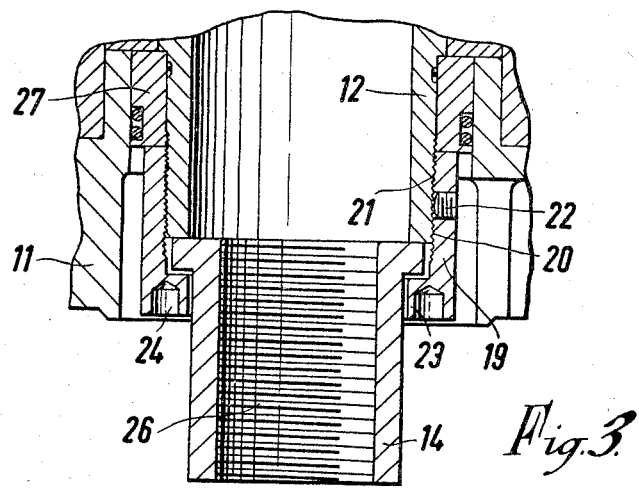
FIGURE 3 is a sectional elevation similar to FIGURE 1 but showing the drive nut inverted.

Although the nut member 14 has been described as being located within the hollow output shaft 12 it will, of course, be understood that the position of the nut member could be reversed so that the main body portion of the nut member would extend downwardly as an extension of the output shaft 12. The arrangement is shown in FIGURE 3 of the drawings and such an assembly is particularly useful for long reach applications, enabling standard hand operated valves to be motorized easily and cheaply.

Furthermore, the nut member 14 can be replaced, for example by a drive sleeve having an internal axial keyway whereby the valve spindle would be keyed to the sleeve for rotation therewith instead of the axial movement as previously described.

In yet a further modified arrangement the nut member 14 is positioned as an extension to the output shaft 12 with the abutting edges of the shaft and nut member in driving engagement. The driving connection is obtained by the engagement of the projections on the end of the output shaft 12 with a pair of corresponding slots in the wall of the nut member 14. The main advantage of this modification is that the diameter of the valve spindle can be nearly as large as the bore of the output shaft.

I claim:

1. A motion transmitting mechanism for an actuator having an output shaft extending from the actuator casing and rotatably driven in one or other direction, said mechanism comprising a nut member having a flange thereon adapted to abut the end surface of the said output shaft, a driving connection between the flange of the nut member and the output shaft whereby the said nut member is rotatably driven in one of two directions in accordance with the rotation of the output shaft, a sleeve surrounding the said nut member and an adjacent portion of the said output shaft, said sleeve threadably engaging said output shaft and having a flange thereon which engages beneath the flange of said nut member to maintain said nut member in driving engagement with the output shaft, and a spindle drivably connected with the nut member for movement thereby in response to rotation of the output shaft of the actuator.

2. A mechanism as claimed in claim 1, in which the driving connection between the output shaft and the nut member comprises at least one driving key-like members which extend axially from the end of the output shaft and which engage corresponding slots formed in the flange of the nut member.

3. A mechanism as claimed in claim 1, in which the nut member is internally threaded so as to engage said threaded spindle which is thereby movable axially in one of two directions in response to rotation of the nut member.

4. A mechanism as claimed in claim 1, in which the nut member is formed with an axial keyway whereby the output shaft is secured therein for rotating the output shaft in accordance with the rotation of the nut member.

5. A mechanism as claimed in claim 1 wherein said output shaft is hollow at one end thereof, said nut member being positioned to extend within the hollow end of said output shaft with its flange abutting the end of said shaft.

6. A mechanism as claimed in claim 1 in which the nut member extends axially from the end of said output shaft as a continuation thereof.

No references cited.

DAVID J. WILLIAMOWSKY, *Primary Examiner.*

L. H. GERIN, *Assistant Examiner.*